ELECTRONIC HIGH SPEED DEVICE INCREMENTING CONTROL CIRCUITRY

Filed Dec. 22, 1966

INVENTORS.
EDWARD F. BRADLEY
HERMAN A. FERRIER, Jr.
BY [signature]
ATTORNEY 3,435,314

ELECTRONIC HIGH SPEED DEVICE INCREMENTING CONTROL CIRCUITRY

Edward Franklin Bradley and Herman Anthony Ferrier, Jr., San Jose, Calif., assignors to International Business Machines Corporation, Armonk, N.Y., a corporation of New York Filed Dec. 22, 1966, Ser. No. 603,966
Int. Cl. H02k 29/00
U.S. Cl. 318—138 12 Claims

ABSTRACT OF THE DISCLOSURE

A high speed device is incremented at variable speed by a motor powered in response to driving pulses selected from a commutator coupled to the motor and from a source external to the commutator. The number of steps the device is to be incremented is entered in a difference-address register to which the driving pulses are also applied for decrementing the number to zero at which time the device is stopped and held in position. An electronic tachometer, delivering energy levels indicative of predetermined rates, is connected to decelerating control AND gates also connected to the lower order stages of the register. The final register stage, indicative of zero count, is connected to drive control logic circuitry for stopping and/or holding the device on the final increment after the device is slowed in response to the successive opening of the AND gates and subsequent switching of the motor to the external pulse source in the decelerating mode.

The invention constitutes improvements over the circuitry disclosed in the copending U.S. Patent application Serial Number 379,794 of Leon J. Thompson, assigned to the IBM Corporation, filed on the 2nd day of July 1964, for "Systems for Controlling Stepper Motor Operations," thereafter issued on the 27th day of June, 1967, as U.S. Patent 3,328,658, and the copending U.S. Patent application Serial Number 423,671 of D. H. Cronquist and J. E. Shepard, assigned to the IBM Corporation, filed on the first day of January 1965, for "Stepping Motor," thereafter issued on the 19th day of March 1968, as U.S. Patent 3,374,410. Another copending U.S. patent application Serial Number 397,395 of John Stuart Sutton, assigned to the IBM Corporation, filed on the 18th day of September, 1964, for "Stepping Motor Positioning Systems," thereafter issued on the 16th day of April 1968, as U.S. Patent 3,378,741, discloses an arrangement useful in the practice of the invention. An embodiment of the invention to be described hereinafter and also in the copending U.S. patent application Serial No. 603,967 of Edward Franklin Bradley filed on the 22nd day of December 1966, for "Electronic High Speed Strip Record Accessing Control Circuitry," thereafter allowed on the 25th day of October 1968, is particularly applicable to control of an electromechanical structure such as that disclosed in the copending U.S. patent application Serial Number 564,190 of Ronald Duane Irvin, assigned to the IBM Corporation, filed on the 11th day of July 1966, for "Strip Record Medium Transporting Apparatus," thereafter issued on the 16th day of January 1968, as U.S. Patent 3,363,853.

The invention relates to circuitry for controlling the incrementing of high speed apparatus with particular emphasis on the decelerating and halting the same precisely at the close of a predetermined increment. While the invention is particularly adaptable to closed-loop stepping-motor servo-systems and magnetic tape recorders driven by variable speed electric motors and the like, it is not necessarily limited to such arrangements as will be evident to those skilled in the art on studying the switched feedback control technique of the invention.

Digital electronic incrementing circuit arrangements are known in the art. Examples of such arrangements of the type to which the invention is directed are found in U.S. Patents 2,121,061, June 1938, Townsend, 40—53; 2,979,-972, April 1961, Danly, 74—821; 3,139,570, June 1964, Jacobson et al., 318—28; 3,206,665, September 1965, Burlingham, 318—312.

The arrangements disclosed in the above mentioned art perform very well but require complicated circuitry for decelerating and stopping with precision at the close of a predetermined increment.

According to the invention, the objects indirectly referred to hereinbefore and which will appear as the specification progresses are attained in closed-loop incrementing servo circuit arrangements incorporating a switched feedback network for controlling an electric motor driven variable speed device driving arrangement.

The device to be incremented a number of steps is driven at a variable speed by one or more motors, powered through electric motor control logic for the particular motor having a drive control logic circuitry as part of the motor control logic for both holding the variable speed motor and/or for driving it in forward and/or reverse directions, in response to pulses obtained from a suitable source, and synchronized with the incrementing of the device. The number of steps over which the device is to be incremented is entered into a multiple stage difference-address, or delta, register to which the driving pulse train is also applied for decrementing the number to zero at which time the device is to be stopped and held in position. An electronic tachometer is coupled to the driving pulse source. The tachometer has a plurality of output terminals each capable of delivering an energy level indicative of a predetermined rate within the range of the tachometer. Some tachometers are arranged so that only one output terminal will deliver the corresponding energy level at any one time. Others will deliver energy back in number proportional to the rate. The output terminals of the tachometer are connected to decelerating control logic circuitry comprising individual AND gating circuits to which the lower order stages of the delta register are also connected in descending order corresponding to the descending speed levels of the tachometer. The final stage of the delta register, which provides an indication of zero count, is connected directly to the drive control logic circuitry for stopping and/or locking the device precisely on the close of the predetermined final increment after the movement of the device is slowed in response to the successive opening of the AND gating circuits and subsequent switching of the driving means to the decelerating mode. Conventional variable speed motors, including stepping motors capable of both fundamental mode and super-speed mode operation, are readily adapted to the invention. Alternately, constant speed driving motors may be used with mechanical arrangements for moving the driven device at different speeds in accordance with displacement of mechanical parts under the control of electric control elements, and electro-mechanical converters, for example, solenoids.

In some applications the tachometer need have only one control output terminal and a single AND gating circuit connected to a predetermined stage of the register will be necessary. In general, however, a plurality will be found advantageous.

In order that the numerous advantages of the invention may obtain in practice, preferred embodiments thereof, given by way of example only, are described hereinafter with reference to the accompanying drawing, forming a part of the specification, and in which.

Figure 1:
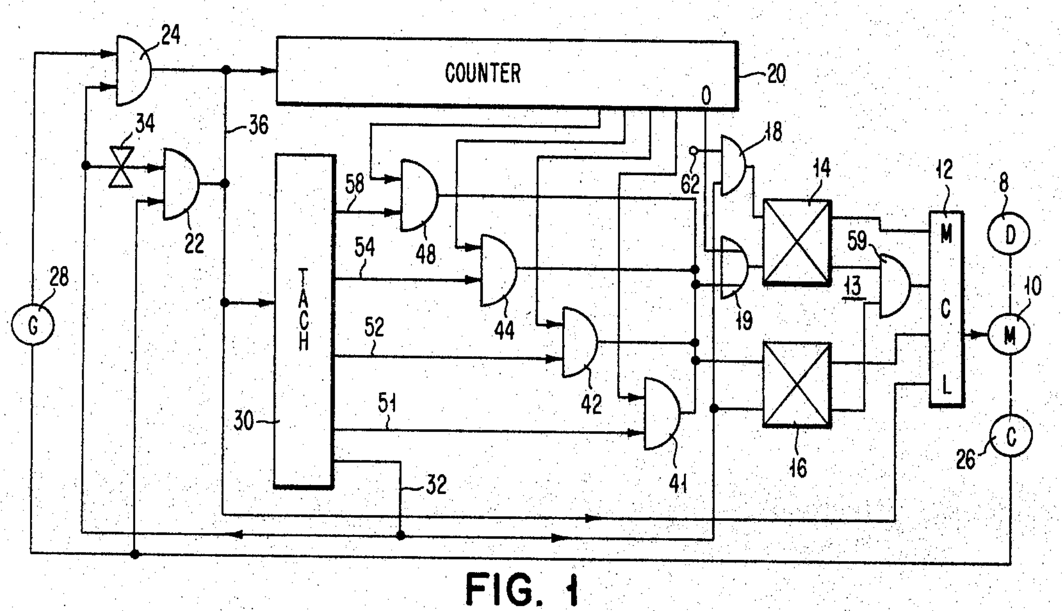
FIG. 1 is a functional diagram of an exemplary embodiment of closed-loop servo-systems incorporating switched feedback networks according to the invention.

In FIG. 1 a device 8 to be incremented a number of steps is mechanically coupled to a motor 10. Insofar as the principles of the invention are concerned the incrementing of the motor 10 itself can be considered as the driven device in many applications. Motor control logical circuitry 12 and drive control logic circuitry 13 shown here as electronic latches 14 and 16 and gating circuits 18 and 19 cooperate in the control of the motor 10. A counter 20 is coupled to the latch 16 to reset the latter when the counter 20 indicates a count of zero. The counter 20 can be one of several known in the art into which a number equal to the number of increments through which the motor 10 is to be moved is loaded by conventional means not shown here. The output lines of a pair of AND gates 22 and 24 are applied to the counter 20 to decrement the same as pulses appear at the output of either of the gating circuits. A commutator 26 is coupled to the motor 10 producing a train of pulses in synchronism with the incrementing of the motor 10 which are applied to the first AND gate 22 and to a substantially fixed rate pulse generator 28 for synchronizing the latter. The fixed pulse rate generator 28 is coupled to the second AND circuit 24, the output line of which is connected to the input terminal of an electronic tachometer 30. One output terminal 32 of the tachometer 30 produces a potential level at a pulse rate substantially equal to the pulse rate of the generator 28 so that the AND gating circuit 24 passes pulses of that fixed rate to the counter 20 and to the tachometer 30 as well as the motor control logic circuit 14 as required. The generator 28 is preferably arranged to generate a pulse train substantially equal to the maximum pulse rate at which the motor 10 is capable of moving in its fundamental mode. The pulse rate of 200 cycles per second is conventional for example, with stepping motors of the type described in the above mentioned copending patent application Serial Number 423,671. An inverter circuit 34 is coupled between the tachometer output terminal 32 and the gating circuit 22 in order to block the output pulse train of the commutator 26 when the rate is between zero and up to a rate substantially equal to that of the generator 28. A number of AND circuits 41, 42, 44 and 48 are individually coupled to output terminals 51, 52, 54 and 58 of the tachometer 30 and to the lower order stages of the counter 20 in descending order as indicated in the diagram. The output lines of the AND circuits are connected together effecting an OR gating circuit, commonly called a Dot OR, or DOR, circuit in the vernacular, and connected to the set terminal of the braking latch 16.

In operation a cycle begins with the counter 20 at zero, the control element latches 14 and 16 reset, and the low speed terminal 32 of the tachometer 30 up at the higher, or active, level of the two possible levels. All other terminals of the tachometer 30 are down to the lower, or inactive, levels. By conventional means (not shown) the counter 20 is loaded with a number proportional to the number of increments over which it is desired that the motor 10 move the driven element 8. The driving latch set terminal 62 is energized to latch the driving latch 14 up enabling the motor circuit logic circuitry 12 to start the driving phase of the cycle. Under control of the logic circuitry 12 the motor 10 is pulsed at a rate determined by the fixed-rate generator 28. The commutator 26 synchronizes the generator 28. The counter 20, which is serving as a difference address or delta register, is being decremented one count per pulse on the pulse line as the motor is incremented one increment per pulse. After a few increments the tachometer 30 will indicate a rate substantially equal to the maximum speed at which the motor 10 is reliably incremented in the prior art arrangements and the level at the low speed terminal 32 falls, passing control of the system to the commutator clock 26. The system is arranged such that the faster the motor 10 turns the faster the clock rate from the commutator 26. This provides a constant acceleration and a subsequent increase in speed which is clocked by the tachometer 30. The speed of the motor 10 will approach a maximum speed at which it will operate until a change in the opposite direction is indicated.

Position overshoot is not permitted, therefore, the motor must slow down to the rate controlled by the generator 28 before the final position increment is reached. The time and distance required to stop at any speed for a given application is predictable, therefore, as the motor speed increases, the tachometer 30 raises terminals 51, 52, 54 and 58 in that order, that is farther from the zero end of the counter 20. As the incrementing progresses, the number in the counter will approach the first stage at which the one AND gating circuit of the group (51–58) enabled by the tachometer 30 will be up. For example, the speed of the motor 10 may be such that gate 44 is enabled by the tachometer 30 over the line from the terminal 54 as the count approaches the number 5. When the number 5 is reached, the output line of the AND gating circuit 44 is raised and the braking latch 16 is set, the motor control logic circuitry 12 is arranged in accordance with the characteristics of the motor 10 to slow the latter down on raising of the latch 16. Slowing may be accomplished simply by letting the motor 10 coast, or braking energy may be actually applied to increase the rate of deceleration of the motor 10, braking may be accomplished with some motors by actually applying reverse driving energy. An AND gating circuit 59 may be used in some applications to lock the motor when the two latches 14 and 16 are reset, depending on the characteristics of the particular motor.

To reiterate, at this time the feedback control line is switched into the control path to reset the running latch 14 and to set the braking latch 16. The motor now begins slowing down, although it is still moving in the same direction due to inertia. When the motor speed drops to the low maximum speed rate, the low speed terminal 32 of the tachometer 30 raises, transferring control back to the low speed generator 28. Because the generator 28 is synchronized by the commutator 26, the transfer is perfectly smooth. The low speed terminal 32 level resets the braking latch 16 and sets the driving latch 14 to continue the forward motion at the lower rate. When the counter 20 reaches zero, both control latches 14, 16 are reset and the motor is stopped in the desired position. The motor is then held in position under the control of the motor control logic circuitry 12 which is arranged for the particular characteristics of the motor 10 under consideration.

While the foregoing description has been limited in the interest of clarity to the operation of the motor 10 in one direction, it should be clearly understood that those skilled in the art will readily effect further control circuitry operating the motor in both forward and reverse directions.

Figure 2:
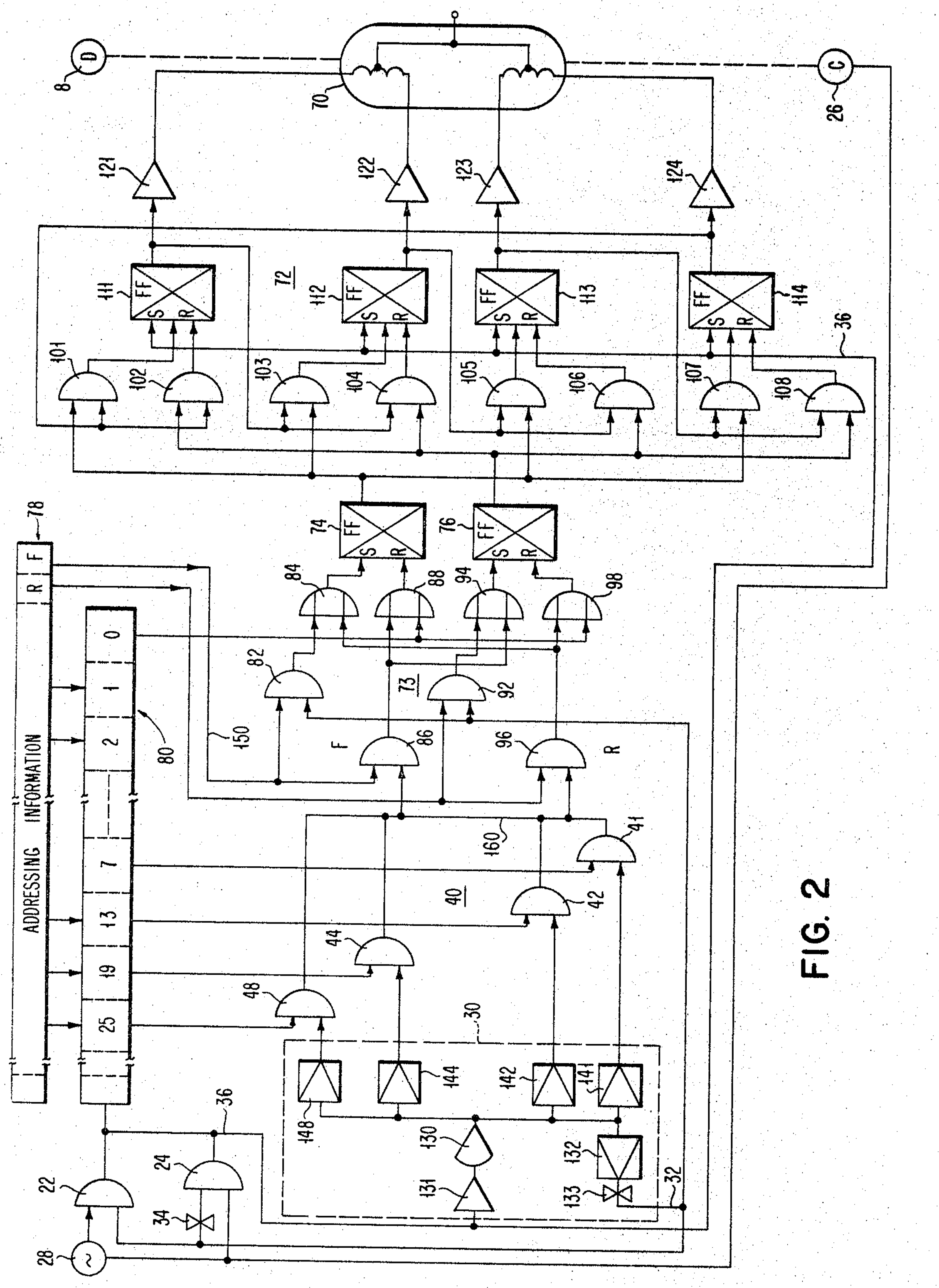
FIG. 2 is a functional diagram of a closed-loop servo-system for driving a stepping motor at high speed.

FIG. 2 shows circuitry more detailed for operating a stepping motor of the type shown and described in the above mentioned copending patent applications Ser. Nos. 397,395 and 423,671 and illustrating improved logical circuitry for effecting reverse and forward drive motor at a minimum of cost, time consumed and with maximum reliability. Such motors are described in detail in these patent applications covering prior art arrangements. Such motors themselves are described in detail in U.S. Patent 2,931,929 issued April 5, 1960, to A. E. Snowden and G. O. Fredrickson, and U.S. Patent 2,982,872 issued May 2, 1961, to G. O. Fredrickson. A prior art motor control circuit for these motors is shown and described in U.S. Patent 3,117,268 issued Jan. 7, 1964, to E. W. Madsen. In brief, these patents describe stepping motors of the type having a stator and a rotor coupled to a device for positioning it in a number of discrete positions and having four field windings selectively energizable in pairs to hold the rotor fixed in position with respect to the stator and for stepping the rotor through a series of four positions.

In many applications, only one AND gating circuit 40 will be necessary, but in other applications, especially where the number of increments is quite large, more than one ANDing circuit will be found helpful in optimizing the performance. The additional ANDing circuits and level detectors in the tachometer 30 are quite inexpensive.

FIG. 2 shows additional details of a practical embodiment of the invention for driving a stepping motor 70 of the type shown and described in the above identified copending patent applications Ser. Nos. 423,671 and 397,395. Operation of the motor control logic circuitry 72, a part of which is a control element 73 having a pair of latches 74 and 76. An address buffer and gating circuit 78 of known configuration is used to load a delta register 80. The latter arrangements are quite conventional in all respects. The addressing information preferably contains data indicating the direction of travel through which the motor 70 is to progress in accordance with the remainder of the addressing information. AND gating circuits 82, 86, 92 and 96, and OR gating circuits 84, 88, 94 and 98 are arranged to set and reset the latches 74 and 76 for running and braking the motor 70. In one direction the latch 74 is a running latch and the latch 76 is a braking latch, while in the other direction the latch 74 is a braking latch and the latch 76 is a running latch. The remainder 72 of the motor control logic for the stepping motor 70 comprises eight AND gating circuits 101–108, four flip-flop circuits 111–114, and four current drivers 121–124. The flip-flop circuits 111–114 are of the dynamic or gated type wherein the set and reset terminals are coupled for alternating current and the switching is effected accordingly on the application of pulses on the line 36.

The tachometer 30 is a known circuit arrangement. The specific arrangement shown comprises an integrator 130 to which the decrementing pulse train is applied, preferably after amplification in an amplifier 131. The integrated voltage is sensed by a plurality of level detectors 132, 141, 142, 144 and 148 of known configuration. The well known Schmitt trigger circuit is well suited for this purpose. An INVerter 133 is shown in connection with the low speed terminal 132 to indicate that this output level is the inverse of that of the other detectors.

In operation of the stepping motor 70, the cycle begins with all control latches reset, the count in the delta register 80 at zero and the output line 32 of the tachometer 30 up. The number of increments and the direction to which the device 8 is to be moved is loaded into the delta register 80 from the source of addressing information 78. For example, to move the device 8 forward 132 increments, the number 132 in binary form is loaded into the delta register 80 and the forward control line 150 is raised and latched. The particular stepping motor described in the aforementioned U.S. patent applications has a maximum fundamental mode speed of 200 cycles per second. The fixed rate generator 28 is therefore designed to deliver approximately 190, but not more than 200, pulses per second, driving the motor 70 in the fundamental mode. The motor 70, in accordance with the teachings in the aforementioned U.S. patent application Ser. No. 423,671, is capable of operation at super-speeds of the order of 1,000 pulses per second.

The latch 74 is set, starting the motor in the forward direction under control of the 200 c.p.s. synchronized oscillator 28 which is synchronized by the output of the commutator 26. The motor is now running in an externally (of the motor-commutator combination) excited mode. After two steps the tachometer 30 indicates a speed of 200 cycles per second and the corresponding gate line 32 drops, transferring control to the motor-commutator clock constituted by the commutator 26. The feedback control is effectively switched out at this time, just as though a switch in the feedback loop of a closed loop servosystem had been opened. This leaves the system operating in a self-excited mode. Thus the advantage of an open loop servosystem is had at high speed without loss of indication of the number of increments through which the device is passing. The commutator clock operates such that the faster the motor turns the faster the clock rate, providing a constant acceleration and a subsequent increase in speed is clocked by the tachometer 30. The delta register is being decremented one count per pulse on the pulse line. In order to avoid position overshoot, the motor 70 must be reduced in speed to 200 cycles per second before the final increment is reached. The time and distance required to stop at any speed is predictable, therefore, as the motor speed increases the tachometer 30 successively opens farther from the lower end of the register 80. At some time, the counter in the delta register will match the gate enabled by the tachometer 30. At this time, a speed reducing control line 160 will be switched into the control path. The speed reducing control line 160 thereupon resets the latch 74 and sets the latch 76. The motor 70 begins slowing down, although it is still moving in the forward direction due to inertia. When the speed of the motor drops to 200 cycles per second as indicated by the commutator 26, the tachometer output line 32, corresponding to 200 cycles per second, raises, reestablishing feedback control of the system by the commutator 26 and the synchronized 200 cycles per second generator 28. When the 200 cycles per second gate line and the tachometer terminal 32 comes up, the latch 76 is reset and the latch 74 is set to continue the forward motions of the motor 70 and the driven device 8 in the fundamental mode of the motor 70. When the number in the delta register 80 is reduced to zero, both of the latches 74 and 76 are reset through the respective OR gates 88 and 98. The motor 70 is now stopped in the desired position and held there by application of current to the windings for this purpose as disclosed in the above mentioned copending U.S. patent application Ser. No. 397,395. For reverse motor movement, essentially the same procedure is followed.

The order of the registers 20 and 80 to which the AND gating circuits are connected is determined in accordance with the characteristics of the motor and/or drive means. With a stepping motor of the type discussed in the above mentioned copending U.S. patent application Ser. No. 397,395, the stages are chosen to bring the motor to 1 or 2 pulses from zero because this motor will attain full speed in two to three pulses from switching time. In the example given, the counts of 7, 13, 19 and 25 were chosen to this end.

Figure 3:
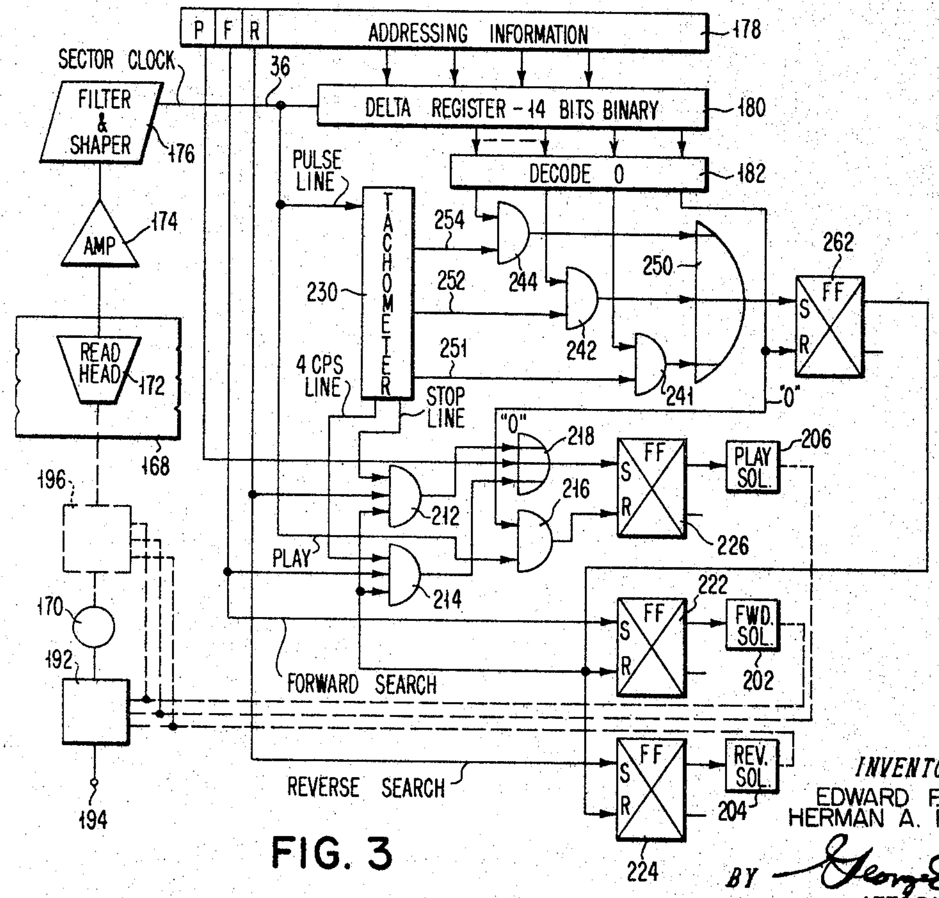
FIG. 3 is a functional diagram of a magnetic tape accessing servo-system incorporating the invention.

FIG. 3 shows an application of the switched feedback control technique in a system for controlling prerecorded magnetic tape at very high speeds. Conventional magnetic tape 168, of which a symbolic length only is shown, is moved by a motor 170 past an electromagnetic transducer 172 for producing a pulse output from prerecorded sector marks. The detector clock pulse train thus generated is applied to an amplifier 174 and regenerated in a shaper and/or filter circuit 176 the output of which is connected to the pulse line 36. Addressing information is available from a source 178 for loading into a delta register 180 to which a decoding circuit 182 is coupled.

The magnetic tape 168 may be driven in any number of ways known to the art and controlled according to the invention. Electric motor control logic 192 is connected to a source of electric power at terminal 194 and may drive one or more motors 170 through mechanical coupling means 196. In the example shown, the electric motor control logic and the mechanical coupling means 196 are operated in response to the operation of forward drive solenoid 202, a reverse drive solenoid 204 and a play drive solenoid 206 which are mechanically coupled to one or the other or both of the electric motor control logic 192 and the mechanical coupling unit 196. For example, the motor 170 may be a variable speed motor responding to a change of applied potential brought about by the operation of the solenoids and the mechanical coupling 196 may be a one-to-one or other ratio fixed gearing. Alternately, the motor 170 may be a stepping motor driving through a suitable drive 196 and the forward drive solenoid 202 and the reverse drive solenoid 204 where they merely throw switches in the electric motor control 192 which may be very much the same as the logic 72 in FIG. 2. The play drive solenoid 206 may then be connected through the motor control logic 192 to drive the stepping motor 170 in the fundamental mode at a stepping rate something under 200 cycles per second. As another alternative the control logic 192 may comprise simple switching and the mechanical coupling means 196 may be a variable ratio drive mechanism, for example, plurality of variable speed belt drives as along the lines set forth in the copending U.S. patent application Ser. No. 564,190 hereinbefore mentioned. Other arrangements are sure to be suggested to those skilled in the art for this part of the arrangement which forms no part of the invention in and of itself.

Three AND gating circuits 212, 214 and 216 and an OR gating circuit 218 are arranged to drive three flip-flop circuits 222, 224 and 226 connected to the solenoids 202, 204 and 206 respectively. An electronic tachometer 230, similar to that previously described, is provided with output lines for enabling AND gating circuits 241, 242 and 244. The output lines of these latter AND gating circuits are coupled through an OR gating circuit 250 to a braking condition flip-flop 252 completing the circuit arrangement. In many cases a dot OR connection will serve as well depending on the degree of isolation required.

The operation, although different from that previously described, is based on the register/tachometer feedback control of the invention. A delta register 180 is loaded with the number of magnetic tape sectors to be accessed. Each sector mark is associated with an absolute address recorded on the tape. This address must be read after each high speed access and may be read only at playback speed in the forward direction. Therefore, during a forward search the tape must be slowed to playback speed, corresponding to a clock rate of about 4 cycles per second, such that upon reaching a zero count the tape address may be read. However, during a reverse search, the tape must be slowed to a stop upon reaching a zero count and then automatically switched to the playback mode for reading the tape address. The pulse line 36 is coupled to the electromagnetic transducer 172 for applying pulses to the delta register 180 and the tachometer 230. The clock rate on the pulse line 36 varies with the speed of the tape 168, and therefore, as the tape access speed increases, the clock rate increases. The tachometer 230 successively opens gates farther from the zero end of the delta register 180. The delta register is decremented by the pulse line 36. When a match occurs between the delta register count and the tachometer speed gate 241 or 242 or 244, the feedback control is switched into the network to slow the tape to playback speed at the desired tape location. The tape is stopped by deenergizing the various control solenoids which control the tape drive.

An embodiment of the invention is contemplated along the lines shown in FIG. 3 for slowing and stopping a magnetic tape from any tape speed between zero and two hundred inches per second.

While the invention has been shown and described particularly with reference to preferred embodiments thereof, and various alternates have been suggested, it should be clearly understood that those skilled in the art may effect still further changes without departing from the spirit and scope of the invention.

We claim:

1. An electronic control circuit arrangement for the high speed incrementing of a device, comprising:
   a multiple stage delta register into which is loaded a number of proportional to the number of increments to be imparted to said device,
   means for incrementing said device,
   means coupled to said device incrementing means for producing a train of pulses proportional to the incrementing of said device,
   an electronic tachometer circuit having a pulse train input terminal and a plurality of output terminals each capable of delivering an energy level indicative of a rate within the range of said tachometer,
   means for applying said train of pulses to said register for decrementing the contents thereof and to said tachometer for indicating the current rate of incrementation of said device,
   drive control logical circuitry coupled to said device incrementing means, and
   decelerating control logical circuitry coupled to said register and to at least one output terminal of said tachometer for deriving a control level and to said control circuitry for controlling said incrementing means in accordance with said control level.

2. An electronic control circuit arrangement for the high speed incrementing of a device as defined in claim 1 and wherein
   said drive control logical circuitry comprises at least one AND gating circuit.

3. An electronic control circuit arrangement for the high speed incrementing of a device as defined in claim 1 and wherein
   said drive control logical circuitry comprises a plurality of AND gating circuits and
   circuitry effecting an OR gating circuit intercoupling said AND gating circuits.

4. An electronic control circuit arrangement for the high speed incrementing of a device as defined in claim 3 and incorporating
   at least one latch having
   a set terminal coupled to said OR effecting circuitry, and
   a reset terminal effectively coupled to the final stage of said register.

5. An electronic control circuit arrangement for the high speed incrementing of a device as defined in claim 4 and wherein
   said pulse producing means comprises an element arranged adjacent said device for deriving pulses as said device is incremented relative to said element.

6. An electronic control circuit arrangement for the high speed incrementing of a device as defined in claim 4 and wherein
   said device incrementing mans comprises a stepping motor and
   said pulse producing means comprises a commutator arranged to deliver a train of pulses as said device is incremented.

7. An electronic control circuit arrangement for the high speed incrementing of a device, comprising:
   a servosystem, including
   a motor coupled to said device for operation selectively at low and high speeds,
   electric current supplying means for said motor,
   electric pulse generating means coupled to said electric circuit supplying means for controlling the operation of said motor at low speed,
   electric pulse producing means coupled to said motor for producing electric pulses in synchronism with the incrementing of said device and coupled to said electric current supplying means,
   an electric gating circuit coupled to said electric pulse producing means and to said electric pulse generating means and to said electric current supplying means, and control means coupled to said gating circuit and to said electric current supplying means for operating said motor at low speed in a mode controlled by said electric pulse generating means and for operating said motor at high speed in a self-excited mode responsive to said electric pulse producing means.

8. An electronic control circuit arrangement for the high speed incrementing of a device as defined in claim 7 and wherein said motor is a stepping motor of the type having four windings and is detented by energizing the windings in pairs and stepped by simultaneously de-energizing one of said energized windings and energizing another.

9. An electronic control circuit arrangement for the high speed incrementing of a device as defined in claim 8 and wherein said electric current supplying means comprises amplifying means individual to said windings, and latch means connected to said amplifying means for energizing said windings selectively.

10. An electronic high speed incrementing arrangement for positioning a device in one of a number of discrete positions, comprising a stepping motor having a stator and a rotor coupled to said device for positioning the same in said number of discrete positions and having four field windings selectively energizable in pairs to hold said rotor fixed in position with respect to said stator and for stepping said rotor through a series of four positions, four bistable circuits for cyclically energizing pairs of said windings, a commutator coupled to said stepping motor for providing a train of pulses indicative of the position of said device, an address register arranged to store a number indicative of the number of increments required to reach a desired position of said device, a tachometer having a pulse input terminal and a plurality of output terminals each delivering an energy level indicative of a rate of incrementation of said motor, a plurality of two-way AND gating circuits having given input terminals individually connected to said output terminals of said tachometer for enabling the gating circuits and other input terminals individually connected to lower order stages of said register and output terminals connected in common, and means coupling said common connection to said bistable circuits, a pulse voltage generator connected to said commutator and synchronized thereby, gating circuitry selectively coupling said pulse generator and said commutator to said register, to said tachometer and to said bistable circuits, and means coupling the last stage of said register to said bistable circuits for stopping said motor.

11. An electronic high speed incrementing arrangement as defined in claim 10 and wherein said latch gating circuitry is enabled by the output of said pulse generator and said commutator as selected.

12. An electronic high speed incrementing arrangement as defined in claim 11 and wherein said latch gating circuitry comprises further gating circuitry for operating said motor selectively in forward and reverse directions.

References Cited

UNITED STATES PATENTS

| | | | |
|---|---|---|---|
| 3,218,532 | 11/1965 | Toscano | 318—20.320 |
| 3,328,658 | 6/1967 | Thompson | 318—375 |
| 3,378,741 | 4/1968 | Sutton | 318—28 |
| 3,370,289 | 2/1968 | Hedgcock et al. | 318—20.260 |

ORIS L. RADER, *Primary Examiner.*

K. L. CROSSON, *Assistant Examiner.*

U.S. Cl. X.R.

318—18, 23; 340—174.1